V. M. DORSEY.
GLASS BLOWING MACHINE.
APPLICATION FILED FEB. 15, 1908. RENEWED DEC. 30, 1911.
1,187,889.  
Patented June 20, 1916.  
7 SHEETS—SHEET 4.
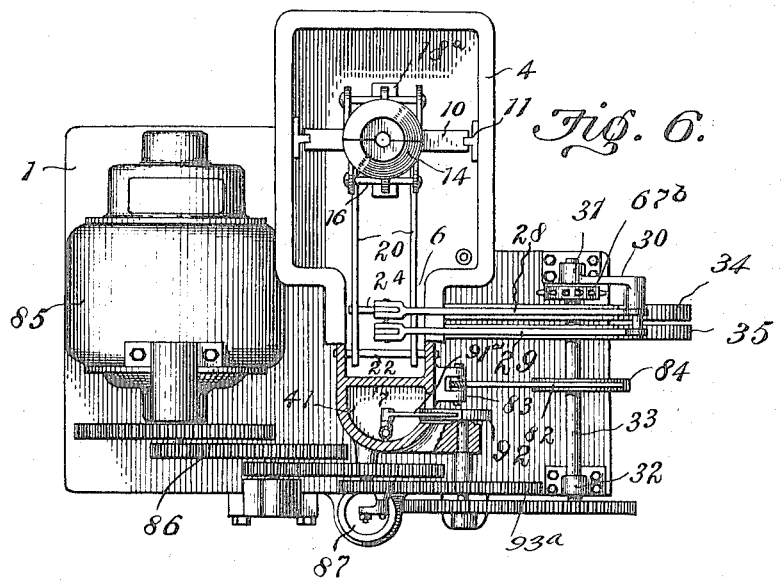
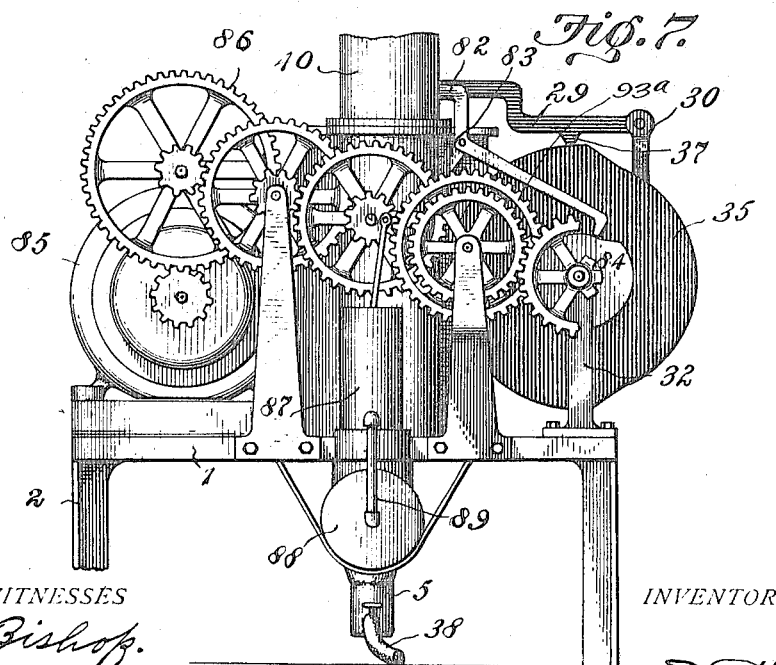
WITNESSES  
INVENTOR

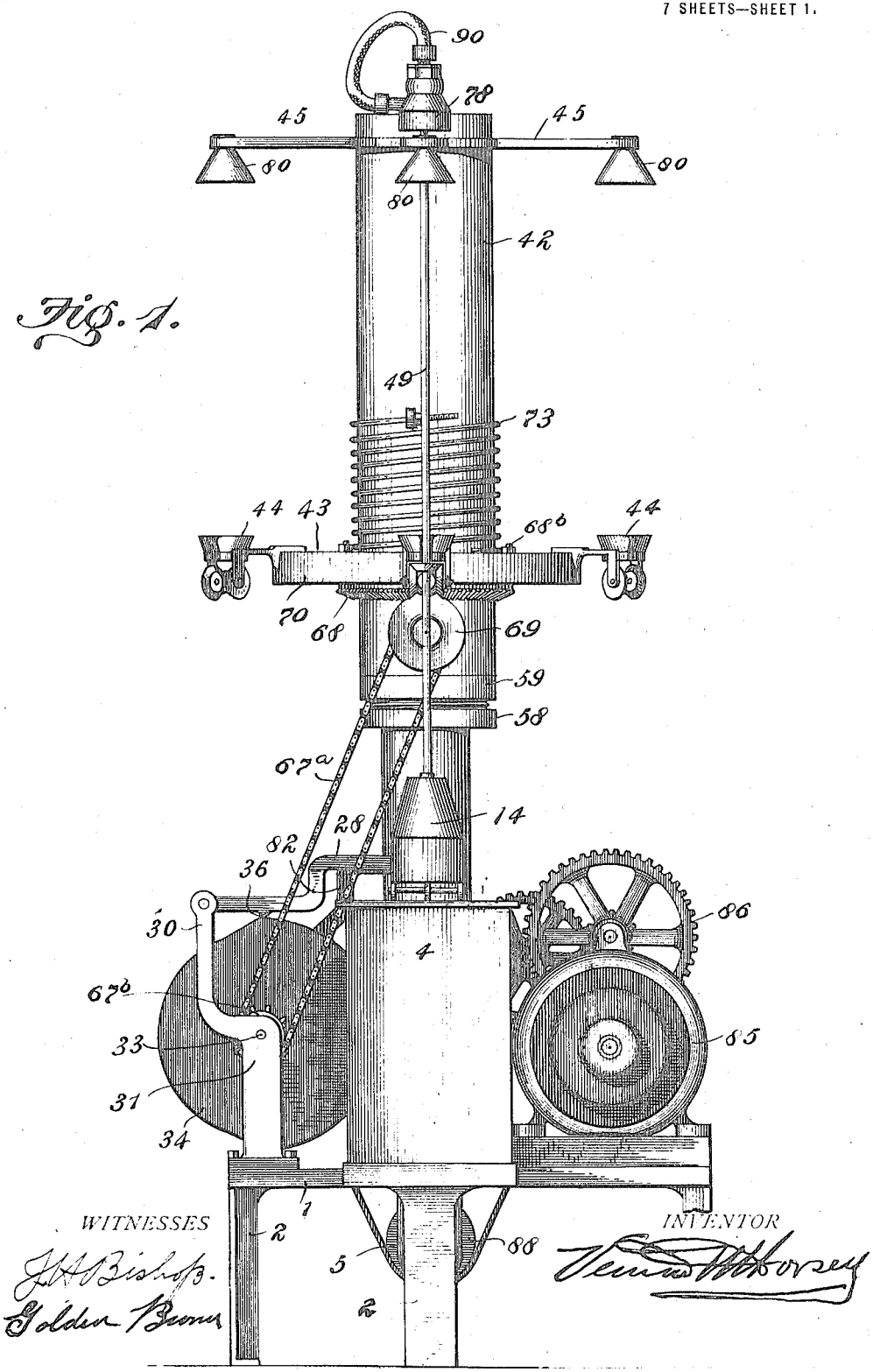

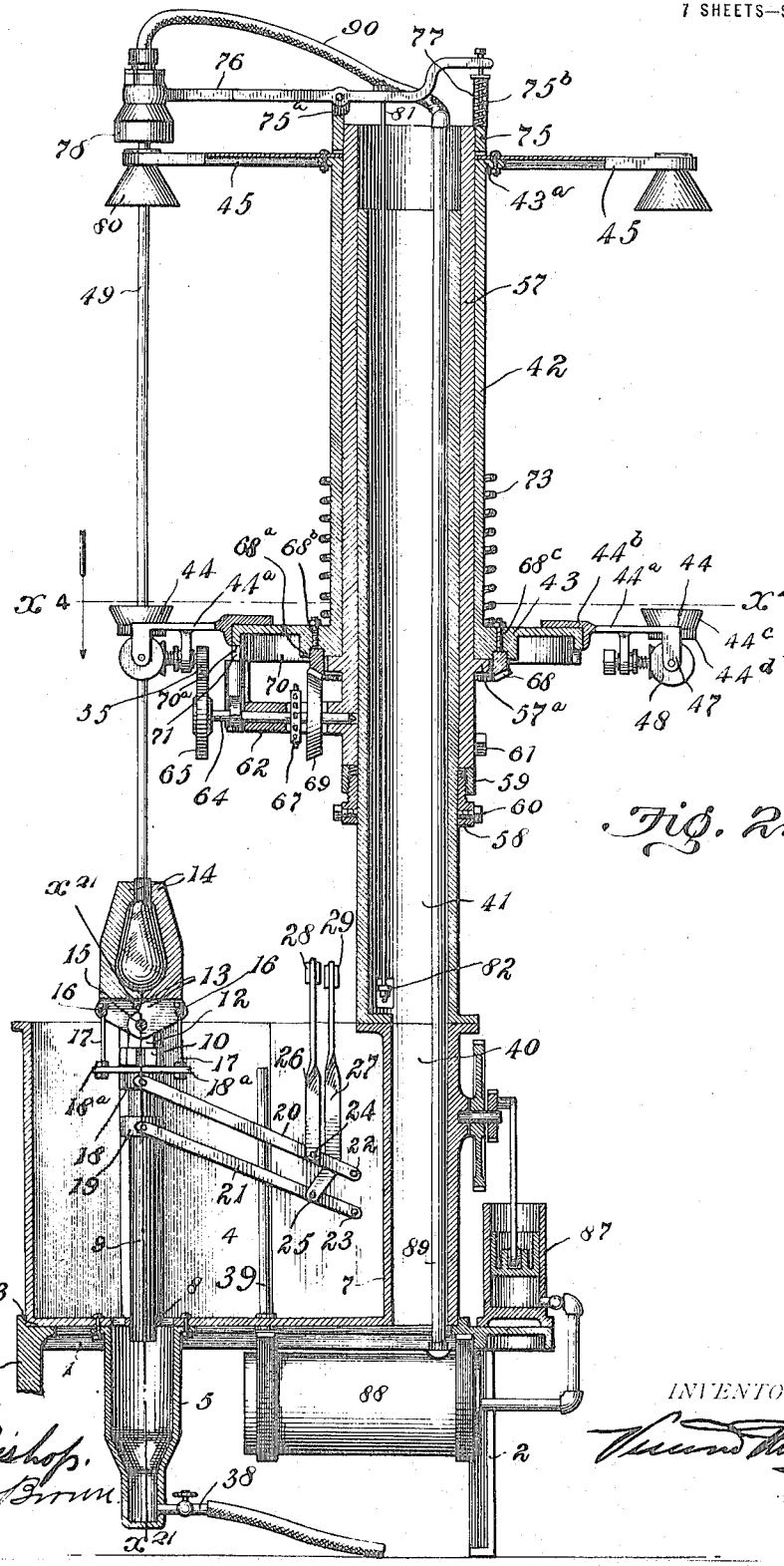

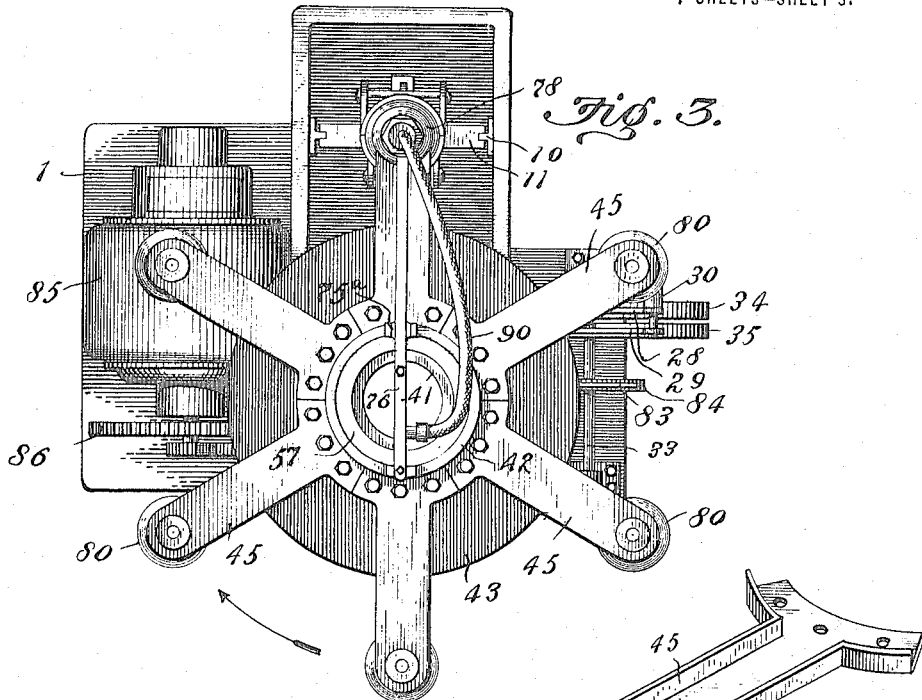

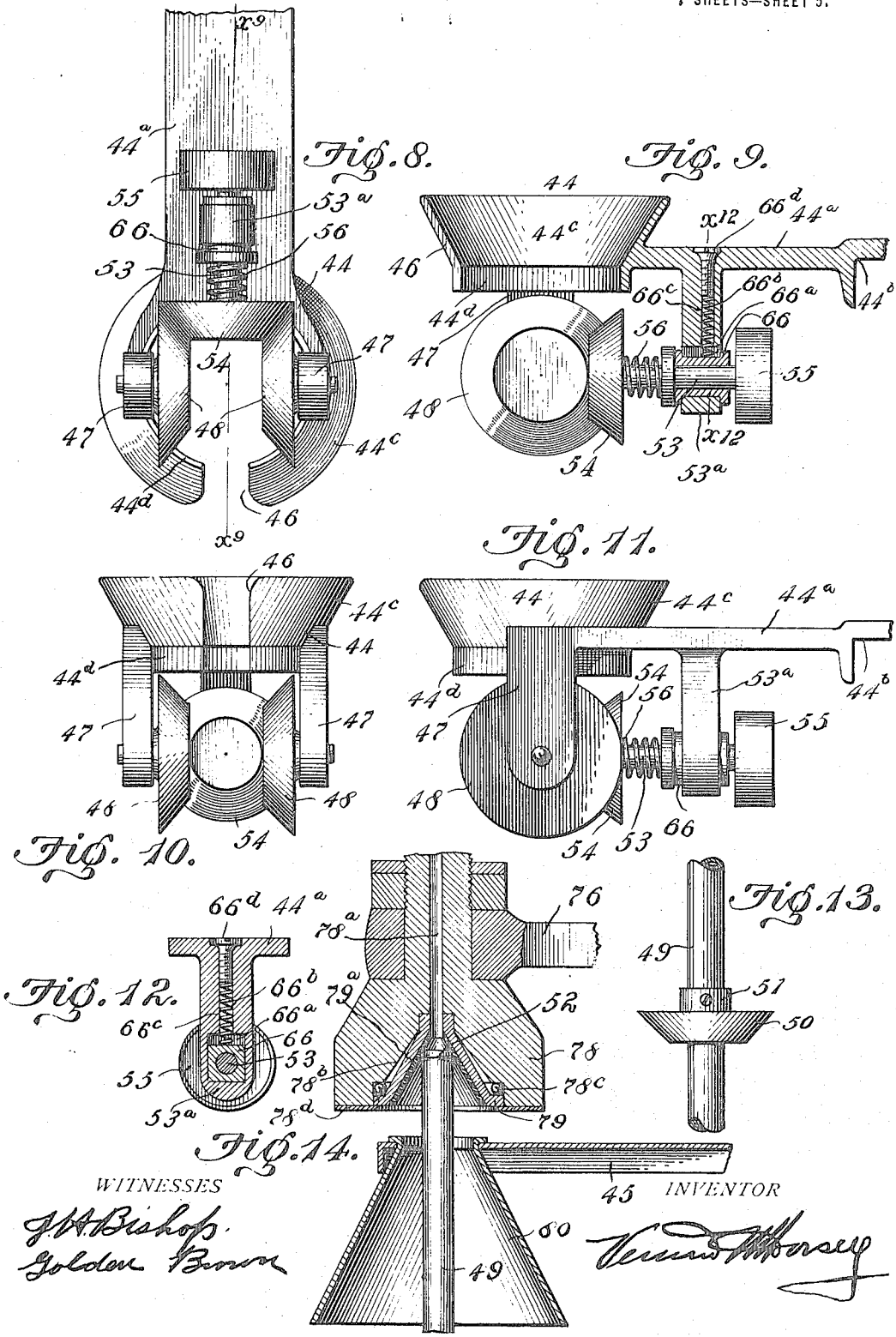

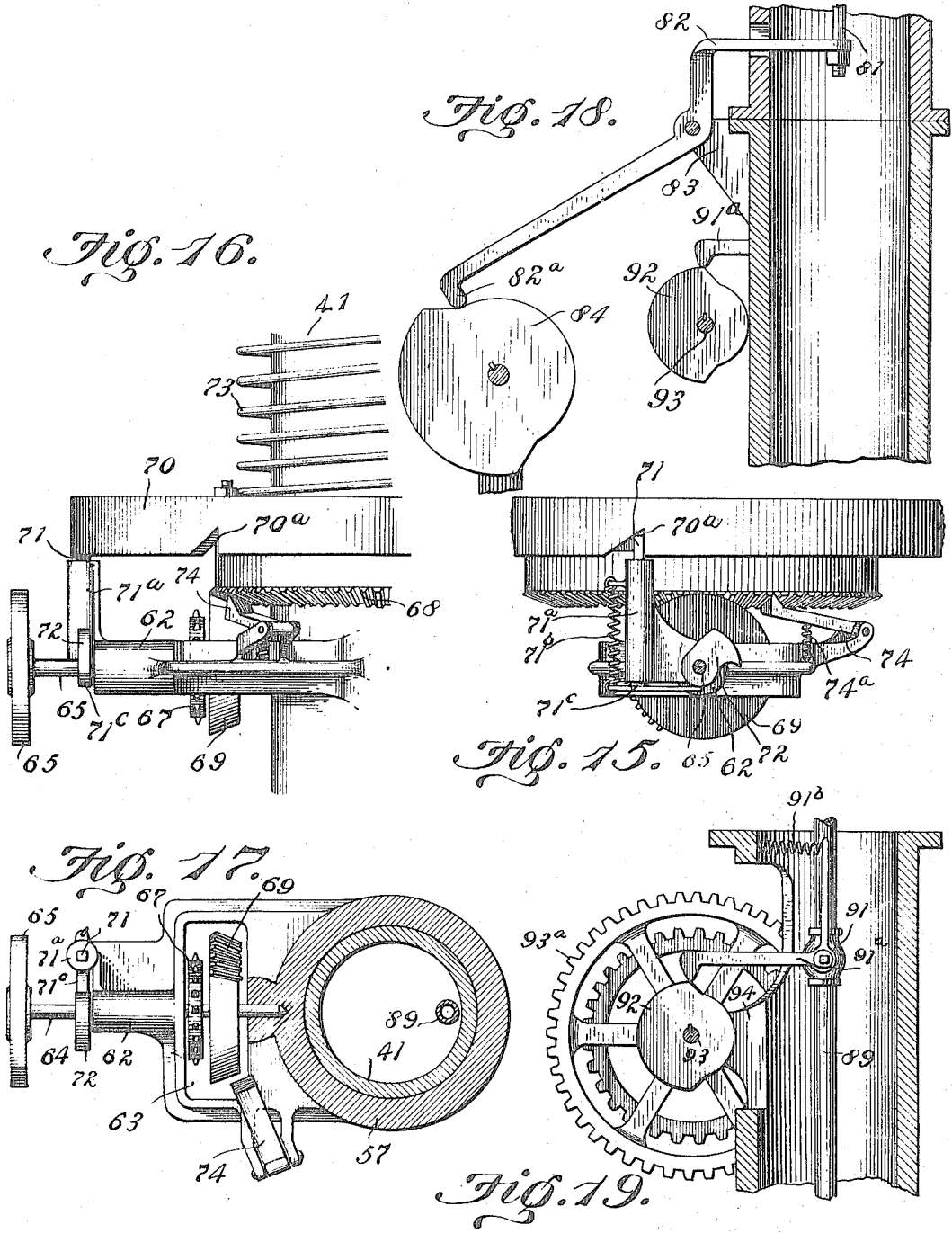

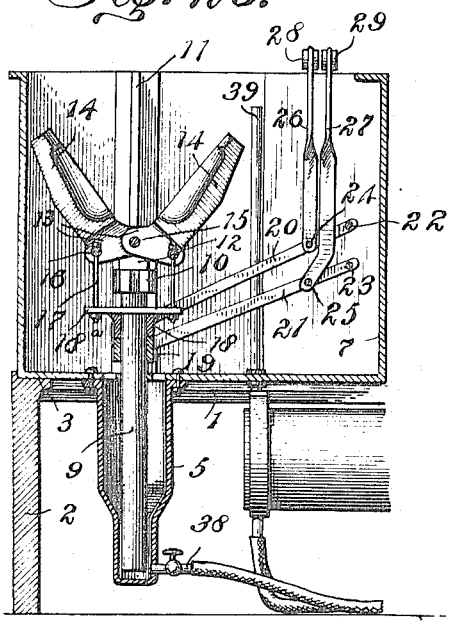
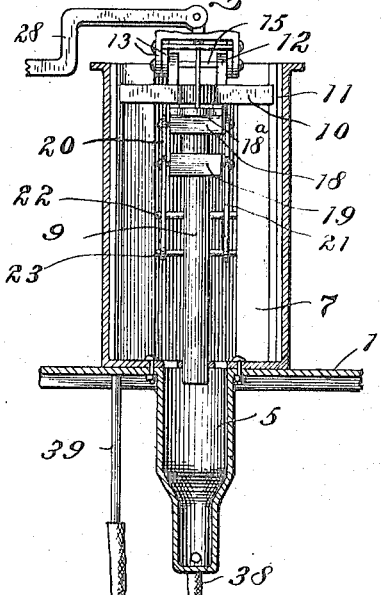
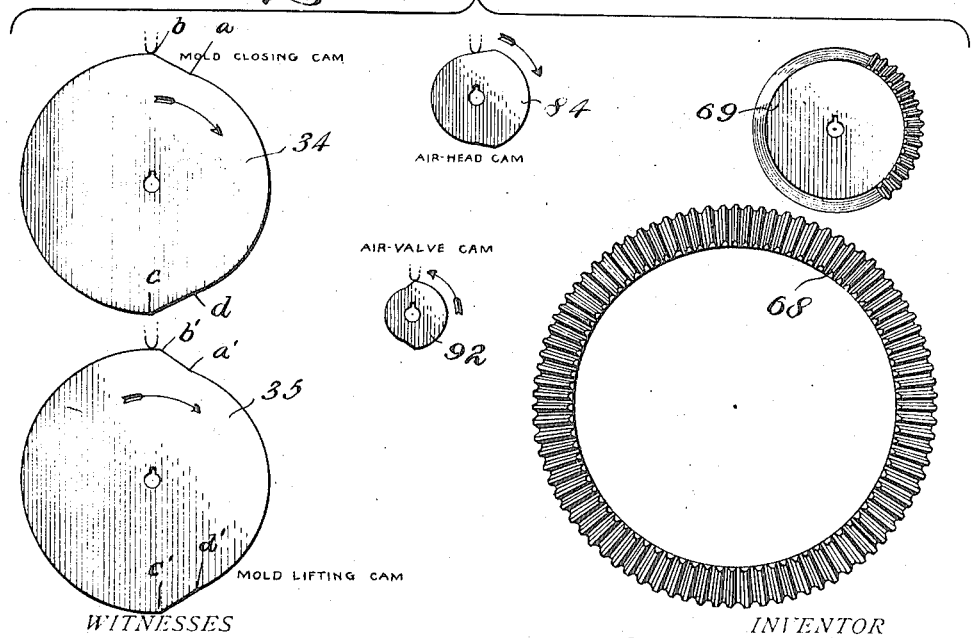

UNITED STATES PATENT OFFICE.

VERNON M. DORSEY, OF LAUREL GROVE, MARYLAND, ASSIGNOR TO EMPIRE MACHINE COMPANY, OF PORTLAND, MAINE, A CORPORATION OF MAINE.

GLASS-BLOWING MACHINE.

1,187,889.        Specification of Letters Patent.      Patented June 20, 1916.

Application filed February 15, 1908, Serial No. 416,153. Renewed December 30, 1911. Serial No. 668,762.

*To all whom it may concern:*

Be it known that I, VERNON M. DORSEY, a citizen of the United States of America, and a resident of Laurel Grove, St. Mary's county, State of Maryland, have invented certain new and useful Improvements in Glass-Blowing Machines, of which the following is a specification.

My invention relates to a machine for performing certain operations attendant upon the production of blown glass articles. In the usual processes employed for the production of such articles a suitable quantity of glass having been gathered upon the end of a blow-pipe, it receives a preliminary shaping by marvering or swinging, and is then inserted in a separable mold, which is closed thereon, and is blown while located within the mold by admitting air to the interior thereof, rotation being simultaneously imparted to the blow-pipe or mold in respect to each other for the purpose of eliminating the impression which would otherwise be made by the joint of the mold.

The machine forming the subject matter of this application is adapted to receive and support a blow-pipe upon which the glass has been properly gathered, and to thereafter perform the operations necessary for its proper manipulation in the mold, that is to say close the mold, wet it, and open it and to admit air from a suitable source to the blow-pipe and also to impart rotation to the blow-pipe in respect to the mold, and to subsequently remove the blow-pipe with the blown bulb thereon from over the mold and to position a rest for another blow-pipe over the mold, its operations being performed automatically. The blow-pipe with the blown article thereon can thus be removed at any desired subsequent time by an attendant without in any way interfering with the access of the workmen to the support for the blow-pipe located over the mold.

The object of the invention disclosed herein is to provide a machine having a non-traveling mold but provided with a traveling blow-pipe carrier and with means for driving the carrier intermittently, so that during the period intervening between the placing of the blow-pipe upon the machine and the finishing of the blow, the blow-pipe will remain stationary in respect to the mold but that subsequently and immediately thereafter it will be carried to a point at which it may be removed, the carrier simultaneously presenting a fresh rest above the mold and being thus adapted to receive another blow-pipe.

My invention for these purposes embodies a suitable mold with means for raising and lowering the same into an outer cooling bath at determined intervals of time and for opening and closing the molds when raised, of a traveling carrier having a plurality of blow-pipe rests and driving mechanism located thereon, each of which carriers and mechanisms is successively brought above and in the axial line with the mold, being periodically arrested in such position at times during the raised position of the mold, and of a non-traveling means for supplying air to the blow-pipes which may be contained in such rests, such means being connected with the blow-pipes only during such period as the holders may be stationary, all of the said parts being so driven by suitable power that their successive actions are automatic.

It further consists in the instrumentality and means whereby the operations above described are carried out and in the combination and arrangement of the several parts thereof as will be hereinafter more fully described and claimed.

Referring to the accompanying drawings in which corresponding parts are designated by corresponding marks of reference:—Figure 1 is a front elevation of a machine constructed in accordance with this invention. Fig. 2 is a central vertical section thereof taken from front to rear. Fig. 3 is a plan view thereof. Fig. 4 is a horizontal section on line $x^4$ $x^4$ of Fig. 2. Fig. 5 is an enlarged inverted perspective view of one of the upper arms of the blow-pipe guiding head. Fig. 6 is a plan view of the base partly in section. Fig. 7 is a rear view of the base. Fig. 8 is an inverted view of a blow-pipe chuck. Fig. 9 is a central section thereof on line $X^9$—$X^9$ of Fig. 8. Fig. 10 is an end view of the blow-pipe chuck. Fig. 11 is a side view thereof. Fig. 12 is a section on line $X^{12}$—$X^{12}$ of Fig. 9. Fig. 13 is a detail fragmental view of a blow-pipe showing the collar thereon. Fig. 14 is a detail sectional view showing the upper blow-pipe guide and the air head. Fig. 15 is a fragmental view in front elevation of the driving mechanism for the blow-pipe carrying frame.

Fig. 16 is a side elevation thereof. Fig. 17 is an inverted plan of the same. Fig. 18 is a sectional detail of the air head actuating mechanism. Fig. 19 is a sectional detail of the air valve actuating mechanism. Fig. 20 is a vertical section taken from front to rear of the mold actuating mechanism, the mold being down and opened. Fig. 21 is a vertical section of the same taken on line $X^{21}-X^{21}$ of Fig. 2. Fig. 22 is a diagrammatical view of the various cams adapted to the special driving mechanism herein shown.

In the following specification a machine will be described which is adapted to have a blowing period of about 5 seconds and a cooling period of about 3 seconds, and to produce 6 completed bulbs per minute, the general drawings being made on a scale of 1 to 8 of such a machine when adapted for the production of what is known as the No. 3 lamp bulb. The scale of the details is 1 to 2 in Figs. 8 to 14, and 1 to 4 in Figs. 15 to 19. It is of course obvious that the proportions may be changed, and necessarily so, for a different output and different sized products.

A suitable base upon which all the parts are mounted is provided and preferably consists of a table 1, provided with legs 2, and having a suitable recess 3 to receive a mold tank, comprising a body casting 4 and a well casting 5. The body casting has a rearward restricted portion 6, divided by a transverse partition wall 7. That part of the body casting between the front wall thereof and the partition 7 forms a mold receptacle, and has an aperture in its bottom beneath which is bolted the well casting. A guide spider 8 is inserted at the mouth of the well casting to serve as a guide for the lower end of the mold carrying plunger 9, the upper end of which is provided with a cross-head 10 running in guides 11 on the side walls of the body casting. The cross-head is provided on its upper surface on each side of the axial line of the plunger with an ear 12, through which and through webs 13 on the separate parts 14 of a two-part mold, a pivot pin 15 passes. The mold therefore opens in the fore and aft plane of the machine. The webs on each half of the mold also receive a pin 16 located away from the pivotal point, to each of which pins is fastened the upper end of a link 17, the opposite ends of which are secured to lugs 18ª projecting from collar 18 movable upon the mold plunger. A second collar 19 is rigidly affixed to the plunger 9 beneath the collar 18 and each of these collars is connected to the front end of a pair of levers, viz., the mold closing levers 20 and the mold lifting levers 21, respectively, which have their rear ends pivoted upon pins 22 and 23 respectively passing through the sides of the mold tank near the rear thereof at points intermediate of the top and bottom thereof. Each pair of the two pairs of levers is further connected intermediate of their ends by pins 24 and 25, respectively, attached to the lower end of links 26 and 27 respectively, the upper ends of which are pivotally attached to the ends of the tappet levers 28 and 29 respectively. The opposite ends of the tappet levers are pivoted to the projection 30 arising from a bearing 31 fastened to the table to one side of the mold tank. It will be seen that as the mold lifting collar 19 is lifted the plunger attached thereto will be raised and thus the mold will be lifted, while if depressed the mold will drop into the tank. It will be further seen, if the collar 18 is raised in respect to the mold plunger, that the mold will be closed, whereas if it is lowered in respect thereto the mold will be opened, and that if it remains stationary in respect to the plunger the mold will remain open or closed as was its previous condition.

Mounted in the bearing 31 and in a corresponding bearing 32 at the rear of the table is the main shaft 33, which carries near its forward end a mold closing cam 34 and the mold lifting cam 35, these cams being located beneath tappets 36 and 37 of the mold closing tappet lever 28 and mold lifting tappet lever 29 respectively. These cams are so shaped that during a certain portion of their revolution the two tappets will be raised in unison and that subsequently thereto the mold lifting tappet will be held stationary while the mold closing tappet continues to be lifted, thus closing the molds, after which both tappets will be held in their raised position for a definite period after which the mold closing tappet will be partly lowered, while the mold lifting tappet remains stationary, after which the two tappets will be lowered in unison, and finally will remain stationary at the lower limit of their movement until they are again lifted by a further revolution of the cams when the cycle before described will again take place. Cams suitable to effect this purpose are shown in Fig. 22 and in the specific embodiment herein shown, the lifting arc $a-b$ of the mold closing cam is 21°, the lifted arc $b-c$ is 186°, the dropping arc $c-d$ is 21° and the depressed arc $d-a$ is 138°, while with the mold lifting cam the lifting arc $a'-b'$ and the dropping arcs $c'-d'$ each measure 18°, the lifted arc $b'-c'$ 186° and the depressed arc $d'-a'$ 138°. With the shaft 33 driven at six revolutions per minute and with the tappets 36 and 37 on the tappet levers 28 and 29 in the position shown in Figs. 1 and 22, that is to say with tappet on the mold-closing tappet lever 36 resting at the point $b$ (the junction of the lifted and lifting arcs) on the mold-lifting cam and the tappet 37 on the mold-lifting tappet lever resting on the mold-lifting cam 35 at a point 3° removed from $b'$ (the junction of the lifted and lifting arcs) the tappets will be at the upper limit of their movement, and the mold will be raised and closed. As the shaft 33 rotates no change will be made in the tappets which will be held at this upper limit of their movement and the mold will thus be held raised and closed until the point $c$ (the junction of the lifting and dropping arcs) on the mold-closing cam comes under the tappet 36 of the mold closing tappet lever, this representing the period of about 5 seconds. A further rotation of the cam will then drop the mold-closing tappet 34, which will be the only one so dropped, until the points $c'$ (the junction of the lifted and dropping arcs) on the mold lifting cam comes beneath the tappet 37 on the mold lifting tappet lever. During this last period, the mold will be opened and will be maintained at its raised position. During the succeeding movement of the cams through an arc of 18°, that is to say until the tappets 36 and 37 on the mold closing and mold lifting tappet levers respectively, rest above the points $d$ and $d'$ (the junctions of the dropping and depressed arcs on the respective cams), the mold will be lowered but inasmuch as the two systems of levers are moving in unison, no change will take place in its open position, and it will then remain opened and at the bottom of its stroke within the tank until the further rotation of the cams through an arc of 138° brings the tappets 36 and 37 on the tappet levers above the points $a$ and $a'$ on the respective cams, that is to say above the junctions of the depressed and lifting arcs thereon, this taking about 4 seconds, during which the mold will be cooling. Upon the further movement of the cams the tappets on the levers, will be raised in unison, thus lifting the mold still open until the tappet 37 on the mold lifting tappet lever reaches the point $b'$ on the mold lifting cam, that is to say the junction of the lifting and lifted faces, at which time the mold will be fully raised but open, it being closed by the further movement of the shaft, during which the tappet 36 will run up the last part of the lifting arc $a$—$b$ on the mold closing cam to the point $b$, the mold lifting levers remaining stationary, thus closing the mold and restoring the parts to the position they occupied at the beginning of the cycle.

For the purpose of supplying cooling water to the mold tank, a supply pipe 38 discharges into the lower part of the well casting, while an exit pipe 39 is lead to near the top of the mold tank for the purpose of controlling the water level therein. By varying the rate of inflow it is obvious that the time for cooling of the mold may be regulated within certain limits and it will be further seen that by restricting the diameter of the mold well at the bottom to approximately the diameter of the plunger it is adapted to receive, (as shown in Fig. 20) the fall of the latter will be cushioned.

Rising from the rear of the tank and above the chamber 40 therein formed between its rear wall and transverse partition 7, is a hollow column 41 which may be flanged and may be bolted to corresponding flanges upon the top of the tank casting, the central cavity in the column being connected with the chamber 40. A tubular hub 42 is mounted upon the upper part of the column and has a flange 43 near the lower end thereof and a flange $43^a$ at its upper end. The lower flange has radially secured thereto at intervals, in the present case, at 60°, a series of sockets 44 disposed at such a distance from the center of the column that they will, in the rotation of the hub thereon pass above the center of the molds. A series of correspondingly placed arms 45 are secured to the upper flange of the hub, and each is provided with an aperture, which is located above the corresponding socket on the lower flange; each socket and the aperture in the corresponding arm, forming a blow-pipe rest. Each of the sockets by preference is of the construction shown in Figs. 8 to 11 inclusive, that is to say each comprises a casting having a web member $44^a$ provided with an angular seat $44^b$ adapted to seat upon and be secured to the lower flange 43 of the hub, the web terminating in a socket which has an internal conical upper portion $44^c$ joined to a cylindrical portion $44^d$ located below it, the socket opening to the front of the casting by a vertical slot 46, the conical portion of the socket serving as a guide for a blow-pipe. The casting has projecting downwardly from its socket portion on each side thereof an ear 47, forming a bearing in which is mounted a conical pulley 48, the two pulleys being adapted to support a blow-pipe 49 by means of a conical flange 50, on the latter. This flange may, as shown in Fig. 13 be formed upon a collar 51 adjustably clamped upon the blow-pipe intermediate of its ends, the upper end of the pipe being coned as at 52 (Fig. 14) to fit the air chuck to be hereinafter described.

Located below the web $44^a$ is the radial shaft 53 carried in a bearing $53^a$ projecting downward therefrom, the shaft having on its forward end a cone pulley 54 located between the supporting pulleys 48 and driving them by friction, the rear end of the shaft carrying behind its bearing a friction pulley 55, the cone pulley 54 being projected forwardly, and against the supporting pulleys 48, by a spring 56 interposed between the cone pulley and the bearing.

Interposed between the hub 42 and the column 41 is the sleeve 57 having thereon an annular flange 57ᵃ upon which the hub rests and upon which it may be rotated. This sleeve is adjustable vertically upon the column by means of a collar 58 and the threaded nut 59 engaging therewith, the collar being provided with means, as a clamp screw 60 whereby it may be clamped in position upon the column. This is for the purpose of accommodating the vertical position of the blow-pipe carrying mechanism to blow-pipes of different lengths. The sleeve is prevented from rotating upon the collar by means of a suitable set screw 61, and carries upon its forward side a projecting bearing 62 of the general shape shown in Fig. 17, that is to say, is provided with a transverse slot 63 intersecting the radial aperture through which extends the counter-shaft 64, which carries upon its forward end the friction drive pulley 65, adapted when a socket is located above the mold to engage with and drive the driven friction pulley 55 corresponding thereto. For the purpose of insuring a positive drive under these conditions, the shafts 53 of the several chucks are carried in bearings 66 capable of movement in vertical slot 66ᵃ in the downwardly projecting lugs 53ᵃ of the webs of the sockets and are pressed downwardly therein by means of the springs 66ᵇ within vertical apertures 66ᶜ in said lugs, which springs may be adjusted by means of the screws 66ᵈ. Upon the counter-shaft 64 near its rear end and in the transverse slot 63 is mounted a driven sprocket 67 to which motion is imparted by a sprocket chain 67ᵃ passing thereover and over a corresponding driving sprocket 67ᵇ upon the main shaft.

For the purpose of automatically bringing the several sockets over the mold and temporarily arresting their motion thereover while the blowing action is taking place, a beveled gear 68 is carried upon the lower side of the lower flange of the hub, and with it meshes a corresponding beveled but mutilated pinion 69 upon the counter-shaft 64. As with the construction shown, one revolution of the hub is to bring six sockets over the molds, the gearing, including the pinions and sprocket wheels, is so proportioned that one revolution of the main shaft 33 corresponds to ⅙ of a revolution of the hub or more properly speaking, one revolution of the hub correspond to 6 revolutions of the driven shaft, and furthermore the bevel gearing and the mutilation thereof is so proportioned that the hub will only commence to move subsequent to the opening of the mold and will remain stationary during at least a part of the time the mold is raised and closed, the arrangement by preference being such that the hub is stationary during the whole period the mold is closed.

For the purpose of accurately arresting the hub in such position that the sockets thereof are in the axial line of the molds, a downwardly projecting annular rim 70 is provided upon the lower flange of the sleeve and is notched, as at 70ᵃ at intervals, into which notches a plunger 71 carried in a guide 71ᵃ in the bearing projection 62 of the sleeve, is projected by a spring 71ᵇ, this plunger being withdrawn at the proper time by a tappet cam 72 located upon the counter-shaft 64 and which engages a toe 71ᶜ thereon, the parts being so proportioned that this withdrawal takes place at the time the uninterrupted part of the driven mutilated pinion is brought into engagement with the beveled gear 68 upon the hub. To avoid the extreme accuracy which would otherwise be necessary in the proportioning of these parts the bevel gear 68 is preferably made in the form of an annulus guided in an annular groove 68ᵃ in the bottom of the lower flange 43 of the hub, it being held in place by bolts 68ᵇ passing through the said flange and working in slots 68ᶜ therein. The toothed annulus thus formed is held at its rearward limit upon the flange in respect to the hub by a spiral spring 73 encircling the hub and having one end fastened thereto and its other end bearing upon a fastening bolt 68ᵇ. By this means also the jar attended upon stopping and starting the hub and the parts carried thereon is avoided, while to prevent backward motion of the toothed annulus when disengaged from the gearing of the mutilated pinion, a dog 74 is pivoted upon the bearing 62, on the sleeve and is pressed by a spring 74ᵃ into the beveled gear so as to arrest its backward movement. When the pinion 69, by its rotation, passes out of mesh with the gear 68, the latter will be prevented from moving rearwardly by the dog, and the tension which has been placed upon the spring 73 by the power transmitted from the gear to move the hub and attendant parts, will be thus exerted upon the hub to force it forwardly until arrested by the plunger 71, which in the meantime has been released by the tappet and which will be driven by its spring into the proper notch upon the rim of the flange as soon as the latter is in the desired position.

At the top of the column and carried on the upper end of the sleeve 57 is a collar 75 having ears 75ᵃ projecting upwardly from the forward edge thereof, in which is pivoted a lever 76, the rear end of which extends rearwardly and is guided between ears 75ᵇ correspondingly located upon the rear of the collar, a suitable spring 77 being located between the ears for the purpose of lifting such rear end of the lever and thus depressing its forward end, which latter, at a point vertically above the molds receives an air head, preferably in the form of a blow-pipe chuck 78, such as is shown in Fig. 14. This chuck consists of a block rigidly held in the arm and provided with a central bore 78$^a$ terminating at its bottom in a conical enlargement 78$^b$ in which is contained a cone 79, suitable bearings in the shape of balls 78$^c$ being interposed between the cone and the block, whereby the cone is free to revolve, it being held in place by a face plate 78$^d$. The inner surface of the cone is packed with suitable material such as rubber 79$^a$ and is adapted to make a tight joint with the upper end of a blow-pipe, which may be beveled to correspond with the counter of the cone, which is so located that bells 80 carried by the arm 45 upon the upper flange 43$^a$ of the hub pass immediately below it. A rod 81 has its upper end secured to the chuck lever in the rear of its pivotal point and passing down within the hollow column has its lower end secured to one end of a lever 82, pivoted in a bracket 83 upon one side of the tank casting, the opposite end of the lever projecting over the main shaft and being provided at that point with a tappet face 82$^a$ coöperating with a cam 84 upon the said shaft, the cam being so shaped that it will lift the tappet end of the lever and will thus lift and maintain lifted the forward end of the chuck carrying lever during certain periods of the rotation of the main shaft, and will at other times release the tappet to permit it to be moved downwardly, and thus the chuck to be seated on a blow-pipe by means of the spring 75$^b$. The cam is so shaped that it lifts the chuck before the blow-pipe carrying frame formed by the hub and parts thereon starts to rotate and permits the chuck to be again depressed after the frame has completed its movement.

Upon the table and on that side thereof opposite to the main shaft 33 is located a suitable motor 85 which drives through intermediate reduction gearing 86 the main shaft 33. A suitable pump 87 secured to the table is driven by the motor and supplies air to a tank 88 located beneath the table, which tank is connected through a pipe 89 located within the chamber 40 of the mold tank and the central cavity of the column and a flexible pipe 90, to the central bore on the chuck body. In this pipe and by preference within the cavity is located an air valve 91, having a tappet arm 91$^a$ thereon projecting through the side wall of a casting and resting upon a cam 92 carried on the forward end of a shaft 93 which has its bearing in a projection 94 on the tank casing, and receives on its rear end one, 93$^a$, of the driving gears between the motor and the main shaft, the gearing being such that the shaft rotates at the same speed as the main shaft. The shape of the cam and angular position thereof is such that the air valve will be opened during such parts of the period as the chuck is depressed as may be desired. As the cam itself is located upon the forward end of its shaft it is susceptible of ready removal and replacement, whereby cams of different contours and adapted to control the air in the desired manner for any article that may be blown can be used interchangeably. The tappet is held down against the cam by means of a spring 91$^b$ attached to one arm of the valve stem, which thus closes the valve when released by the cam.

In the operation of a machine constructed as above, the operator having gathered a suitable mass of glass upon a blow-pipe and having given it such preliminary treatment as is usually given in hand blowing and prior to its introduction into the mold, inserts the upper end of the blow-pipe through the bell 80, in the carrier frame, which is approaching or is above the mold, and lifts the blow-pipe enough to bring the flange thereon above the rim of the corresponding socket, passing the body of the pipe below such flange through the slot in the socket. This is by preference done while the mold is open and furthermore by preference after the carrier frame has come to rest after its intermittent movement. Presuming that it is done at this time and at the interval after the mold has been raised but while it still remains open, the rotation of the shaft will close the mold through the mold closing mechanism before described, and will furthermore draw down the air head by means of the air head cam 84 on the main shaft, thus bringing the chuck down upon the upper end of the blow-pipe, which is being rotated by means of the blow-pipe rotating mechanism above described. Air will be admitted into the chuck and blow-pipe by the actuation of the air valve 91 by its cam 92, and the article will be blown. After a proper time the further rotation of the shaft will open the mold and lower it by the mold actuating mechanism, will cut off the air and will release the air head actuating mechanism to permit the blow-pipe to be raised from out of contact with and away from the upper end of the blow-pipe. After this latter has been done and the mold has been opened, the mold carrier will be rotated through an arc of 60° by means of the unmutilated part of the pinion 69 engaging the beveled gear 68, the plunger 71 having first been retracted and withdrawn from the notch 70$^a$ on the lower flange of the hub by means of the tappet 72, the drive of the carrier being through the elastic connection formed by the spiral spring 73, which thus absorbs the shock due to starting the carrier from its position of rest, being thereby put under tension. When the carrier has completed its proper arc of movement the unmutilated part of the pinion passes out of mesh with the beveled gear and the carrier is positively stopped and locked in its proper position by means of the plunger, while backward rotation of the bevel gear is prevented by the dog 74, which thus serves as an abutment against which the tension of the spring 73 is exerted to positively force the hub forward to an extent sufficient to accurately aline and engage with the plunger. In its rotation the carrier carries with it the blow-pipe to which the blown glass is pendant and brings another socket above the mold. Into such socket another pipe may be now inserted.

It is obvious that the blow-pipe with the blown article may be removed by hand after it has been moved from over the mold or that if desired it may remain in its socket and receive such other usual and further mechanical treatment by appropriate accessory instrumentalities as may be desired and that likewise pipes may be placed upon the sockets prior to the time such sockets will come over the mold and while thereon may receive preliminary mechanical treatment by appropriate accessory devices. Such devices however form no part of the subject matter of this invention and it is not therefore necessary to describe the same, as they exist in the art in various forms.

Having thus described my invention, what I claim and desire to secure by Letters Patent is:—

1. In a glass blowing machine, the combination with a non-traveling mold, of a traveling blow-pipe carrier located above the mold and provided with a series of rests each of which has friction pulleys adapted to receive a blow-pipe, and a friction pulley fixed in relation to the mold and adapted to rotate the pulleys upon any of the rests when such rest is located over the mold, substantially as described.

2. In a glass blowing machine, the combination with a non-traveling mold, of a traveling blow-pipe carrier having a plurality of blow-pipe rests thereon, supporting pulleys located on the carrier adjacent to the several rests and a non-traveling pulley imparting motion to the pulleys of each rest when the latter is located above the mold, substantially as described.

3. In a glass blowing machine, the combination of a non-traveling mold, a traveling blow-pipe carrier, a series of blow-pipe rests upon the carrier, supporting pulleys located on each side of the axis of each of the rests, a radial shaft carried by the support for driving the said pulleys and non-traveling means for rotating the shaft, substantially as described.

4. In a glass blowing machine, the combination with a non-traveling separable mold, of a traveling blow-pipe carrier having a plurality of blow-pipe rests thereon, means for rotating the carrier and arresting it with a rest above the mold, pulleys located on the carrier adjacent to the rests and adapted to support the blow-pipes contained therein, non-traveling means for driving the said pulleys when the rests to which they appertain are located above the mold, and means for opening and closing the molds and periodically feeding the carrier, substantially as described.

5. In a glass blowing machine, the combination with a non-traveling mold, of a rotating blow-pipe carrier having a series of rests thereon, each of which comprises means for revolving the blow-pipes, means for intermittently feeding the carrier and arresting it with a rest thereon above the mold and means for driving the blow-pipe rotating means of each rest when that rest is above the mold, substantially as described.

6. In a glass blowing machine, the combination with a non-traveling mold, of a rotating blow-pipe carrier, having a series of blow-pipe rests, blow-pipe supporting pulleys on opposite sides of each of the said rests, and a radial shaft adjacent to each rest, adapted to drive the said pulleys, and carrying a friction wheel thereon, slotted bearings in which the said shafts are carried, and a constantly driven non-traveling pulley engaging the pulley upon the radial shaft, substantially as described.

7. In a glass blowing machine, the combination with a non-traveling mold, of a rotating blow-pipe carrier, a gear, a spring connection between the gear and blow-pipe carrier, a mutilated pinion driving the said gear and means for arresting motion of the blow-pipe carrier when released by the mutilated pinion, substantially as described.

8. In a glass blowing machine, the combination with a non-traveling mold, of a rotating blow-pipe carrier, a gear, a resilient connection between the gear and blow-pipe carrier, a mutilated pinion driving the said gear and means for arresting motion of the blow-pipe carrier when released by the mutilated pinion, and means actuated in unison with the mutilated pinion to release the blow-pipe carrier, substantially as described.

9. In a glass blowing machine, the combination with a non-traveling mold, of a rotating blow-pipe carrier, a gear, a resilient connection between the gear and blow-pipe carrier, a mutilated pinion driving the said gear and means for arresting motion of the carrier and to prevent rearward rotation of the carrier when released by the mutilated pinion, substantially as described.

10. In a glass blowing machine, the combination with a non-traveling mold, of a rotating blow-pipe carrier, a gear, a resilient connection between the gear and the blow-pipe carrier, a mutilated pinion driving the said gear, means for arresting motion of the blow-pipe carrier when released by the mutilated pinion, means actuated by the mutilated pinion to release the blow-pipe carrier, and means to prevent the rearward rotation of the gear, substantially as described.

11. In a glass blowing machine, the combination of a base, and a tank, of a vertically movable separable mold located in the tank, means for lifting the mold and closing it when lifted, and for opening it and lowering it, a column arising from the tank, a blow-pipe carrying frame revolving upon the column, a plurality of blow-pipe rests, each provided with blow-pipe rotating mechanism, carried by the frame, means for intermittently moving the frame when the mold is open and for arresting it with a rest above the mold, means for driving each of the blow-pipe rotating means when above the mold, and an air head carried upon the column and vertically movable above the mold, and means holding the blow head down while the mold is closed and for admitting air thereto.

12. In a glass blowing machine the combination of blowing and molding mechanisms, of a blow-pipe supporting frame, a blow-pipe carried therein, and means for moving the frame to bring the blow-pipe in registration with the blowing and molding mechanisms and for removing it therefrom, substantially as described.

13. In a glass blowing machine, the combination with a non-traveling mold and a non-traveling air head, of actuating mechanism for the mold, of a removable blow-pipe support adapted to receive a blow-pipe to position it in operative position relative to the mold and air head during the blowing, and means synchronized in respect to the mold actuating mechanism to move the blow-pipe support to remove the blown article away from the mold when the latter is opened.

14. In a glass blowing machine the combination with a non-traveling separable mold and a non-traveling air head located above the mold, a movable blow-pipe carrier having a position of rest intermediate of the mold and head, and means for opening the mold and disengaging the head from the blow-pipe and for alternately moving the carrier.

In testimony whereof, I hereunto set my hand this 4th day of February, 1908.

VERNON M. DORSEY.

In presence of—
J. HOWARD BISHOP,
GOLDEN BROWN.